United States Patent
Fernández et al.

(10) Patent No.: US 11,092,823 B2
(45) Date of Patent: Aug. 17, 2021

(54) OPHTHALMIC LENS DESIGN INCORPORATING A VISUAL ACUITY PROFILE

(71) Applicant: Indizen Optical Technologies of America, LLC, Torrance, CA (US)

(72) Inventors: José Alonso Fernández, Madrid (ES); Eduardo Pascual, Madrid (ES); Daniel Crespo, Torrance, CA (US); Juan Antonio Quiroga, Madrid (ES)

(73) Assignee: Indizen Optical Technologies of America, LLC

( * ) Notice: Subject to any disclaimer, the term of this patent is extended or adjusted under 35 U.S.C. 154(b) by 274 days.

(21) Appl. No.: 16/134,321

(22) Filed: Sep. 18, 2018

(65) Prior Publication Data
US 2019/0086690 A1  Mar. 21, 2019

Related U.S. Application Data

(60) Provisional application No. 62/560,065, filed on Sep. 18, 2017.

(51) Int. Cl.
G02C 7/02 (2006.01)
G02C 7/06 (2006.01)
G02C 7/04 (2006.01)

(52) U.S. Cl.
CPC ............. *G02C 7/025* (2013.01); *G02C 7/028* (2013.01); *G02C 7/061* (2013.01); *G02C 7/04* (2013.01)

(58) Field of Classification Search
CPC .......... G02C 7/02; G02C 7/025; G02C 7/061; G02C 7/028; G02C 7/04; G02C 7/024;
(Continued)

(56) References Cited

U.S. PATENT DOCUMENTS 225,950 A    3/1880  Schiffling
3,910,691 A  10/1975 Maitenaz
(Continued)

FOREIGN PATENT DOCUMENTS

DE    4342234 A1   6/1994
EP    0880046 B1   3/2010
(Continued)

OTHER PUBLICATIONS

Gómez-Pedrero et al., "Phenomenological model of visual acuity", Journal of Biomedical Optics 21(12), 125005, published Dec. 2016. 10 total pages.
(Continued)

*Primary Examiner* — Travis S Fissel
(74) *Attorney, Agent, or Firm* — SoCal IP Law Group LLP; Mark A. Goldstein

(57) ABSTRACT

Methods for ophthalmic lens design incorporating a visual acuity profile are disclosed. The methods include applying rules and functions to visual acuity profile data and an ophthalmic prescription to generate ophthalmic lens parameters for a subject. The visual acuity profile data includes a maximum visual acuity for the subject. The visual acuity profile data may also include a focus tolerance or tolerable blur. Tolerable blur may be measured by an ophthalmic professional or extrapolated. The visual acuity profile data may also include eye physical data such as pupil diameter and eye size, accommodation, retinal photoreceptor cell packing information and neural processing information. The visual acuity profile data may also include personal biographic and/or medical information for the subject.

28 Claims, 5 Drawing Sheets

(58) Field of Classification Search
CPC .......... G02C 7/027; G02C 7/06; G02C 7/065;
G02C 7/08; G02C 7/081
USPC .......... 351/159.73–159.78, 159.01,
351/159.41–159.43, 159.46, 159.47
See application file for complete search history.

(56) References Cited

U.S. PATENT DOCUMENTS

| | | | |
|---|---|---|---|
| 4,514,061 A | | 4/1985 | Winthrop |
| 5,719,658 A | | 2/1998 | Ahsbahs et al. |
| 6,183,084 B1 | | 2/2001 | Chipman et al. |
| 6,595,637 B2 | | 7/2003 | Ahsbahs et al. |
| 6,709,105 B2 | | 3/2004 | Manezes |
| 6,824,268 B2 | | 11/2004 | Rubinstein et al. |
| 6,956,682 B2 | | 10/2005 | Wooley |
| 7,334,893 B2 | | 2/2008 | Altheimer et al. |
| 8,152,300 B2 | | 4/2012 | Lindacher |
| 8,474,972 B2 | | 7/2013 | Sutton et al. |
| 8,708,485 B2 | | 4/2014 | Marin et al. |
| 2003/0117580 A1 | | 6/2003 | Frantz et al. |
| 2004/0169820 A1 | | 9/2004 | Dai et al. |
| 2007/0115432 A1 | | 5/2007 | Thibos |
| 2008/0033546 A1 | * | 2/2008 | Liang .................. A61F 2/1613 623/5.11 |
| 2008/0106697 A1 | | 5/2008 | Pedrono |
| 2011/0270596 A1 | * | 11/2011 | Weeber .................. G02C 7/02 703/11 |
| 2011/0279774 A1 | | 11/2011 | Dai |
| 2012/0092614 A1 | | 4/2012 | Bjoern et al. |
| 2012/0229758 A1 | | 9/2012 | Marin et al. |
| 2015/0226983 A1 | * | 8/2015 | Carmon .................. G02C 7/065 351/159.42 |
| 2015/0355480 A1 | | 12/2015 | Contet et al. |
| 2016/0317025 A1 | * | 11/2016 | Lee ...................... A61B 3/0041 |

FOREIGN PATENT DOCUMENTS

| | | |
|---|---|---|
| EP | 3088938 A1 | 11/2016 |
| FR | 2704327 A1 | 10/1994 |
| WO | 03/048841 A1 | 6/2003 |
| WO | 2006/009657 A1 | 1/2006 |
| WO | 2007/142981 A2 | 12/2007 |

OTHER PUBLICATIONS

E. Villegas and P. Artal, "Visual acuity and optical parameters in progressive-power lenses," Optom. Vis. Sci. 83(9), 672-681, (2006).

Campbell F.W., Green D.G., "Optical and retinal factors affecting visual resolution", J. Physiol., 181, 576-593, (1965).

Legge G.E., Mullen K.T., Woo G.C, Campbell F.W., "Tolerance to visual defocus", J. Optical Soc. Am. A, 4, 851-863, (1987).

Holladay J.T., Lynn J.M., Waring G.O., Gemmill M., Keehn G.C., Fielding B., "The relationship of visual acuity, refractive error, and pupil size after radial keratotomy", Arch. Ophthalmol. 109, 70-76, Published Jan. 1991.

Atchison D., Smith G. Efron N., "The effect of pupil size on visual acuity in uncorrected and corrected myopia", Optom. Vis. Sci., 56(5), 315-323, (1979).

Raasch T.W., "Spherocylindrical refractive errors and visual acuity", Optom. Vis. Sci. 72, 272-275, (1995).

Nestares O., Navarro R. and Antona B., "Bayesian model of Snellen visual acuity", J. Optical Soc. Am. A. 20, 1371-1381, (2003).

World Intellectual Property Office, International Search Report and Written Opinion for International Application No. PCT/US2018/051528, dated Dec. 6, 2018, 11 total pages.

European Intellectual Property Office, European Search Report for application No. 18857371.1 dated May 19, 2021, 9 total pages.

* cited by examiner

OPHTHALMIC LENS DESIGN INCORPORATING A VISUAL ACUITY PROFILE

RELATED APPLICATION INFORMATION

This patent claims priority from U.S. provisional patent application No. 62/560,065 filed Sep. 18, 2017, the contents of which are incorporated by reference in their entirety.

NOTICE OF COPYRIGHTS

A portion of the disclosure of this patent document contains material which is subject to copyright protection. The copyright owner has no objection to the reproduction by anyone of the patent disclosure as it appears in the Patent and Trademark Office patent files or records, but otherwise reserves all copyright rights whatsoever.

BACKGROUND

Field

This disclosure relates to the design of lenses for ophthalmic use, and, in particular, designing and/or optimizing progressive lenses based on a visual acuity profile of a lens wearer.

Description of the Related Art

Most ophthalmic lenses are configured according to mathematical calculations in an effort to reduce blur. Blur is an objective magnitude that can be computed solely from lens properties and lens position with respect to the eye. These mathematical calculations fail to take into consideration the subjective clarity of images as perceived by a lens wearer or user. Visual acuity can be used to evaluate and anticipate the effectiveness of a lens from the subjective perception of a lens wearer or user, as the same amount of lens-produced blur can cause different variations of visual acuity in different persons.

Visual acuity is a metric for visual quality that is widely used by optometrists and ophthalmologists. Visual acuity is derived from multiple aspects of the visual system, namely optics of the eye, characteristics of the retina, and the processing of visual information in the visual cortex. Attempts have been made to model a process for predicting the visual acuity of a given subject (that is, lens wearer) from visual system parameters. Some visual acuity evaluation models consider the complete set of eye aberrations of the subject, the eye size, the pupil diameter, characteristics of the photoreceptor cell mosaic on the subject's fovea, and the information processing, mixing and filtering in the subject's visual cortex. These models require information that cannot be measured in the standard ophthalmic professional's practice room. Even in well-equipped facilities, part of the information needed to feed a complex model of visual acuity can only be guessed.

Historically, mathematical blur calculations have been the primary way lenses are evaluated and designed. However, ophthalmic lenses designed based on a combination of visual acuity and blur create a more pleasing and more effective progressive lens for a lens wearer. This disclosure describes using a visual acuity profile that is a function relating visual acuity with blur for a given individual. As described herein, the visual acuity profile is used to evaluate and anticipate the effectiveness of a lens from the subjective perception of a lens user or wearer, which in turn can be used for the design of lenses better adapted to the individual.

DETAILED DESCRIPTION

Methods of designing lenses for ophthalmic use based on a visual acuity profile of a lens wearer are described herein. The methods are particularly useful for the optimization of progressive lenses. The progressive lenses may be contact lenses or eyeglass lenses.

Environment

Figure 1:
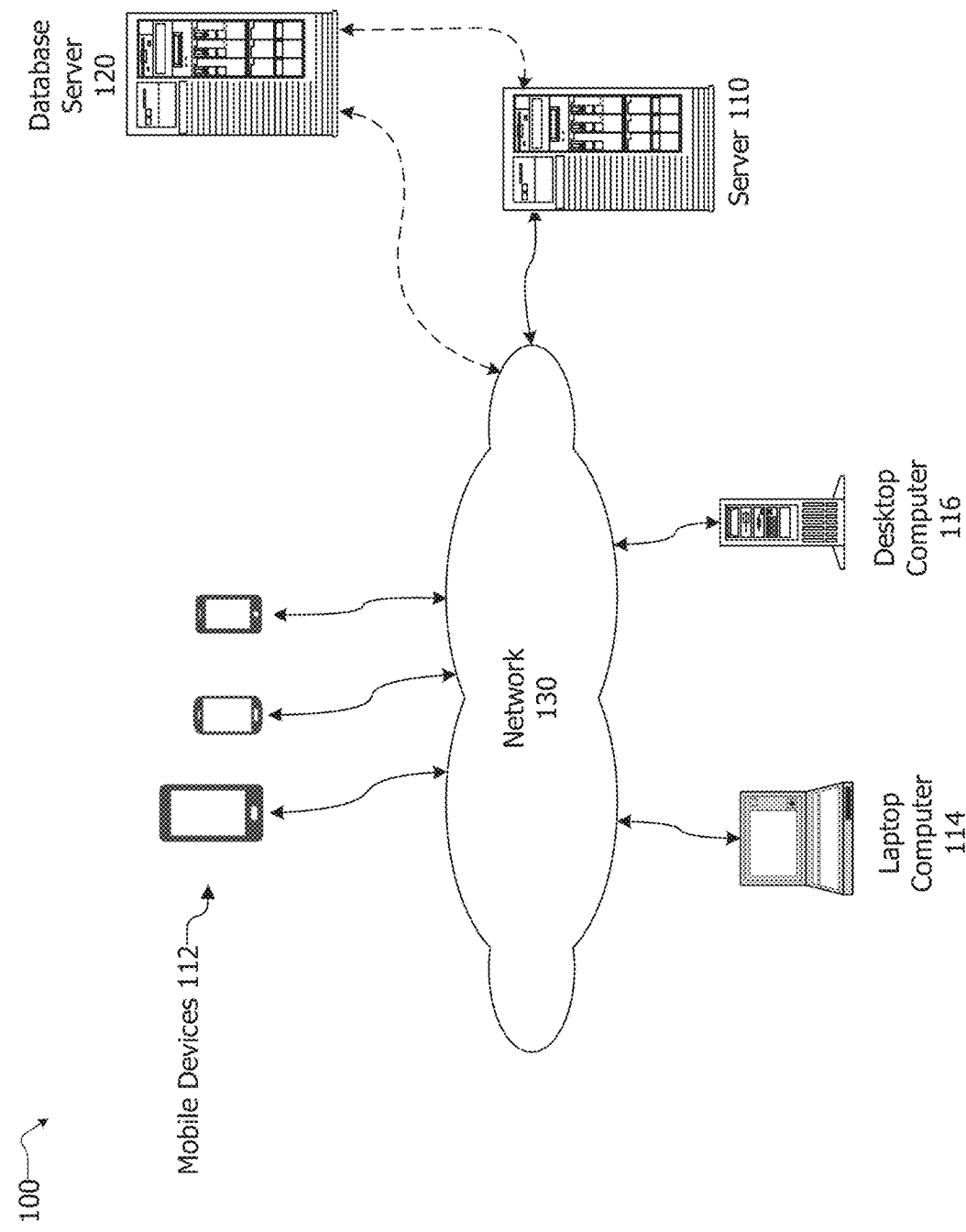
FIG. 1 is a drawing of a computing environment in which the methods described herein may be implemented.

FIG. 1 is a drawing of a computing environment in which the methods described herein may be implemented. The methods described herein are implemented in software that is stored and executed in a computer or other computing device. A computing device as used herein refers to any device with a processor, memory and a storage device that executes instructions including, but not limited to, personal computers, desktop computers 116, server computers 110, mini-computers, mainframe computers, super computers, computer workstations, mobile devices 112 such as computing tablets and smartphones, portable computers, and laptop computers 114. These computing devices run an operating system, including, for example, variations of the Microsoft Windows, Linux, Android, Apple Mac and other operating systems.

The software is stored on a machine readable storage medium in a storage device included with or otherwise coupled or attached to a computing device. That is, the software is stored in electronic, machine readable media. These storage media include, for example, magnetic media such as hard disks; optical media such as compact disks (CD-ROM and CD-RW), digital versatile disks (DVD and DVD±RW), and BLU-RAY; silicon based storage including solid state drives (or silicon storage devices) (SSDs) and flash memory cards; and other magnetic, optical, and silicon storage media. As used herein, a storage device is a device that allows for reading and/or writing to a storage medium. Storage devices include hard disk drives, SSDs, DVD drives, flash memory devices, and others.

The computing device may include software for providing functionality and features described herein. The computing device may include one or more of: logic arrays, memories, analog circuits, digital circuits, software, firmware, and processors such as microprocessors, field programmable gate arrays (FPGAs), application specific integrated circuits (ASICs), programmable logic devices (PLDs) and programmable logic arrays (PLAs). The components of the computing device may include specialized units, circuits, software and interfaces for providing the functionality and features described here.

The processes, functionality and features described herein are embodied in whole or in part in software which operates on a computing device and may be in the form of firmware, an application program, an applet (e.g., a Java applet), a browser plug-in, a COM object, a dynamic linked library (DLL), a script, one or more subroutines, an operating system component or service, or a combination of these. The hardware and software and their functions may be distributed such that some components are performed by one computing device and others by other computing devices. The computing device may be or include or be coupled directly or over a network 130 with specialized computing devices and software such as database software and one or more database servers 120. The computing device may include network capable hardware and network software that allows the computing device to communicate by wired and/or wireless communications. The network 130 may be a local area network (LAN), wide area network (WAN), a combination of these, and may be or include the Internet.

Processes

The methods described herein use a visual acuity profile of a subject to generate lens parameters for lenses to be worn by the subject. The result is a better performing lens. The visual acuity profile of an individual includes visual acuity profile data. The visual acuity profile reflects the relationship between visual acuity and blur (which is the combined effect of defocus and astigmatism produced by the lens). Maximum visual acuity is the visual acuity the eye can achieve with the best possible correction, that is when the image is in focus. However, the retinal image can be blurred because of defocus, astigmatism, or both resulting in reduced visual acuity that manifests itself as a blurred patch in the field of view of the subject. Oblique aberrations in all ophthalmic lenses produce defocus and astigmatism, and reduce visual acuity. Similarly, aberrations related to progressive lenses produce defocus and astigmatism, and reduce visual acuity. The combined effect of spherical defocus S and cylindrical astigmatism C is blur $\delta$ shown by $\delta = \sqrt{\frac{1}{2}[S^2 + (S+C)^2]}$, referred to herein as the blur calculation.

The key component of the visual acuity profile is the maximum visual acuity for the subject. The maximum visual acuity for the subject is the visual acuity without blur. This is shown as $V_{max1}$ and $V_{max2}$ for two individuals in FIG. 3. Another parameter of the visual acuity profile data may be tolerance to defocus. Alternatively tolerable blur can be used as a parameter in the visual acuity profile. Tolerable blur is the maximum blur the user can tolerate before visual acuity drops below certain threshold value. Another parameter of the visual acuity profile data may be accommodation. In addition, in some implementations the visual acuity profile data may include eye physical data such as pupil diameter, eye size, and other data such as the retinal cell packing and neural processing of visual information. Pupil diameter and accommodation impact the visual acuity for a given amount of blur for an individual. A small pupil makes the eye more insensitive to blur and produces some reduction in maximum visual acuity for the individual. A very dilated pupil reduces the maximum visual acuity as well, and also makes the individual highly sensitive to blur, such that both maximum visual acuity and tolerable blur are reduced for this kind of individual.

Figure 2:
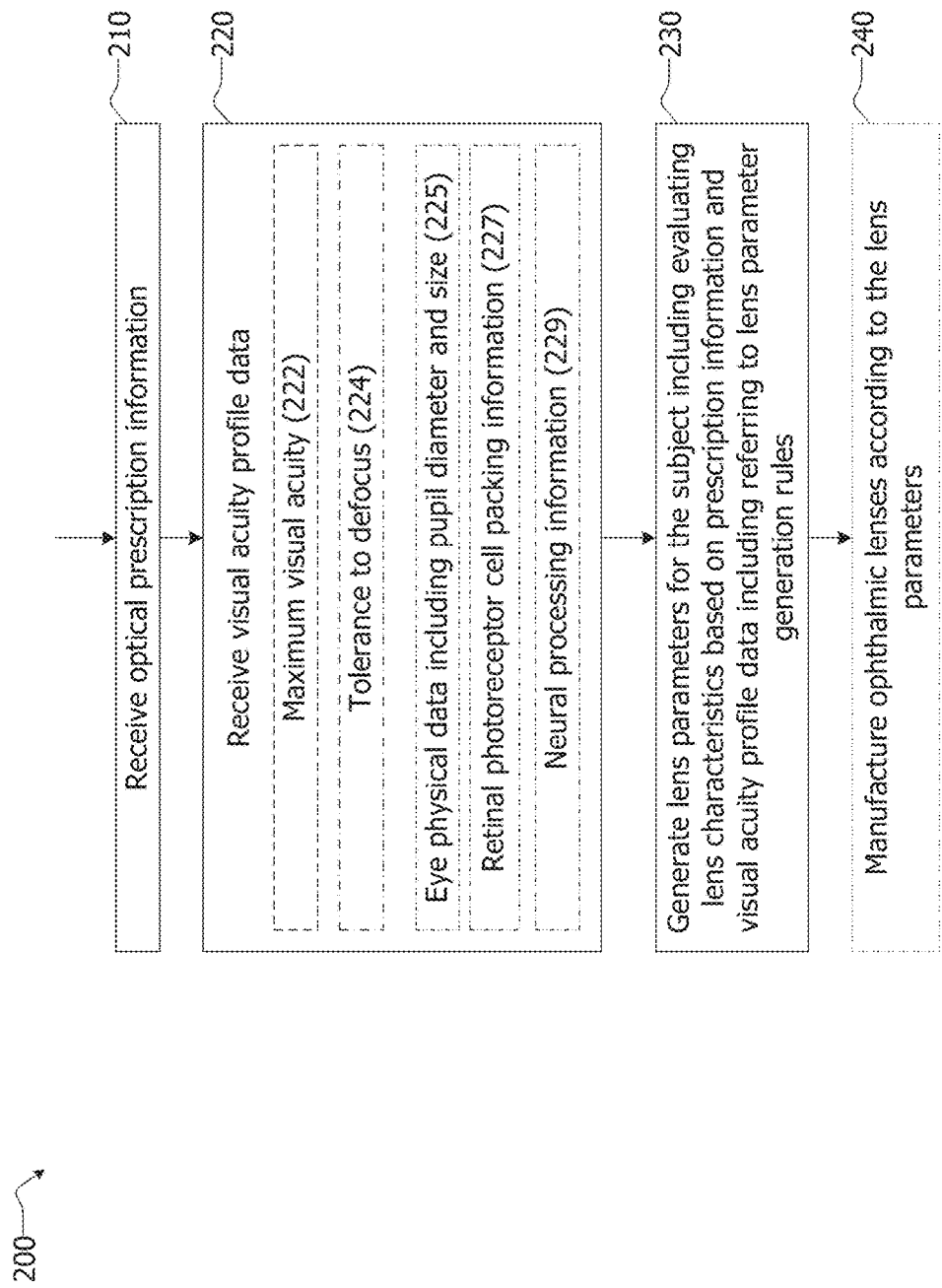
FIG. 2 is a flow chart of a method of generating lens parameters for designing a progressive lens using visual acuity profile data.

Referring now to FIG. 2, a method of generating lens parameters for designing ophthalmic lenses based on the visual acuity profile of a subject is shown. Optical prescription information for a subject is received or obtained, as shown in block 210. The optical prescription information (210) is prepared by or obtained from an ophthalmic professional such an optometrist or an ophthalmologist. The optical prescription information includes oculus dexter and oculus sinister values for sphere, cylinder axis, prism and base for distance and/or near range as and if needed for the particular subject.

A visual profile of the subject in the form of visual acuity profile data are obtained, received and/or prepared as shown in block 220. The visual acuity profile data (220) includes, in one embodiment, a measurement of the maximum visual acuity for the subject (222). The maximum visual acuity is typically obtained by an ophthalmic professional. In some embodiments, the maximum visual acuity is used to extrapolate or determine other parameters (such as, for example, tolerable blur) used as part of the visual acuity profile data. To do this, a database of pertinent ophthalmic data may be consulted. The database may be included with a computing device that executes the method or could be included in a neighboring or remotely accessible database server 120 described above regarding FIG. 1.

In one embodiment, the maximum visual acuity is obtained by an ophthalmic professional by, after applying the best possible optical prescription in a trial set of lenses, adding lenses to blur the subject's view of an image, altering both sphere S and cylinder C, in steps of 0.25 diopters. This allows the ophthalmic professional to best identify the measurements for maximum visual acuity for the subject. This adding of lenses may be done multiple times in an iterative manner. The blur calculation from above is then calculated based on the identified measurements taken by the ophthalmic professional.

In another embodiment, the visual acuity profile can also be obtained from a mathematical model (described by Jose A. Gomez-Pedrero and Jose Alonso in "Phenomenological model of visual acuity," Journal of Biomedical Optics 21(12), 125005 (14 Dec. 2016) as $$V = [MAR_0(D) + (DK\delta)^Q]^{-1/Q}$$

where D is the pupil diameter which can range from between 1 and 7 mm. Optimum pupil diameter is between 2 and 3 mm. Small pupil diameter reduces visual acuity but increases the tolerable blur. Large pupil diameter reduces both maximum visual acuity and tolerable blur. Pupil diameter of an individual may be measured by an ophthalmic professional. $MAR_0$ (D) is the minimum angle of resolution (MAR) the human eye can achieve for a given pupil diameter D. MAR is measured by the ophthalmic professional in a manner like that described in the prior paragraph. K is a dimensionless constant that takes into account individual related parameters, as higher order aberrations, which can be set to 0.5, and ranges between 0.4 and 0.6 for most individuals. The tolerance to defocus Q is a dimensionless parameter related to the tolerable blur. The larger Q, the larger the tolerable blur. Q ranges between 1.5 (low tolerable blur) and 4 (large tolerable blur).

In one embodiment, the maximum visual acuity is used to extrapolate the tolerance to defocus (224). In this embodiment, the maximum visual acuity measurement is used to derive the maximum blur the user can take $\delta_0$ for a given maximum loss of visual acuity $\Delta V$, that is, the tolerable blur. The blur $\delta_0$ may also be referred to as the tolerable blur of an individual. The tolerable blur or focus tolerance is measured in diopters and is typically in the range 0.25 to 1 D. This is discussed more below regarding FIG. 3. Statistically, the larger the maximum visual acuity, the smaller the tolerable blur or focus tolerance, which is shown in both FIGS. 3 and 4.

As used herein, the terms defocus and blur are used interchangeably as synonyms, where the term "defocus" is understood as including both spherical defocus and astigmatic defocus. However, strictly speaking, blur is a consequence of defocus. When an eye suffers some defocus, the image of a point in the retina will not be a point, but a blurry disk. When vision is perfect the eye is in focus, there is no defocus. When an eye has some refractive error, the eye suffers defocus. Refractive error (or prescription) can be specified by the standard sphero-cylindrical components $[S_p C_p \times \alpha_p]$ but if can also be specified by the matrix $$\mathbb{R}_p = \begin{pmatrix} R_{xp} & R_{tp} \\ R_{tp} & R_{yp} \end{pmatrix},$$

where both are related by $$R_{xp} = S_p + C_p \sin^2 \alpha_p$$

$$R_{yp} = S_p + C_p \cos^2 \alpha_p$$

$$R_{tp} = -C_p \sin \alpha_p \cos \alpha_p$$

If a lens is used to compensate for the refractive error, its power should be the same as the refractive error it compensates for. In matrix notation, $\mathbb{R}_l = \mathbb{R}_p$, and when this condition is met, the refractive error, and at some points its power differs from that of the prescription. This problem is especially acute with progressive lenses, for which the power variation required to provide good vision at different viewing distances produces unwanted power at some regions of the lens. When the lens power does not match the prescription at some point, a residual power error is produced whenever the user looks through that point. This residual power error is obtained by subtraction of the corresponding matrices, $\mathbb{R} = \mathbb{R}_p - \mathbb{R}_l$. The spherical and cylindrical components $[S, C \times \alpha]$ of the residual power error can be obtained from matrix $\mathbb{R}$, by inversion of the conversion formulas presented above. Here, S is the spherical defocus, C is astigmatism, both measured in diopters.

Returning to a discussion of FIG. 2, other data that may optionally be included in the visual acuity profile data include eye physical data such as pupil diameter and eye size (225); retinal photoreceptor cell packing information (227); neural processing information (229); and may include other pertinent data for the subject's ophthalmic condition.

Lens parameters for the subject are generated as shown in block 230. Lens parameters are those parameters needed for manufacturing a lens and define the lens geometry and optical properties of the lens. Example lens parameters include the sag height map defining the free-form surface, the tilt (prism) of the same, the base curve of the lens blank used for manufacturing, the refractive index of the material, the Abbe number of the material, and the lens thickness at one or more points. The generating lens parameters includes evaluating lens characteristics based on the prescription information and the visual acuity profile data including referring to lens parameter generation rules (including merit functions), as shown in block 230. Example lens parameter generation rules are described below. The generating (230) may occur repetitively and/or recursively to winnow a preferred or optimal set of lens generation parameters.

The lens generation parameters may then be used to manufacture ophthalmic lenses for the subject, as shown in block 240. In one embodiment, the computing device executing the method may initiate manufacture of ophthalmic lenses by communicating the lens generation parameters to a neighboring system coupled with the computing device. In another embodiment, the computing device executing the method may initiate manufacture of ophthalmic lenses by transmitting the lens generation parameters to a manufacturing location at a different geographic location from where the method is executed. In another embodiment, the computing device executing the method may communicate the lens generation parameters to a third party manufacturer, to the subject who can then shop for lenses by presenting the lens generation parameters to multiple manufacturers, or to an ophthalmic professional who can then initiate lens creation based on the lens generation parameters.

Returning to a discussion of block 220 of FIG. 2 and receiving visual acuity profile data, some of the visual acuity profile data may be obtained by direct measurement, while other components may be inferred from statistical correlations based on previous measurements. These measurements and historical visual acuity data may be maintained in one or more databases that are part of the system described herein or made accessible to the system described herein.

As a preliminary step, the database(s) may be created by accessing and/or compiling data from one or multiple sources of information about ophthalmic measurements that include some or all of the components of the visual acuity profile. For example, pairings of blur with maximum visual acuity, pairings of tolerance to defocus with maximum visual acuity, and other arrangements and combinations of visual acuity data that when combined form a visual acuity profile. The data may be obtained from subjects involved in studies, from patients who provide the information after visiting an ophthalmic professional, etc. In this way, the database may be accessed to obtain related unknown parameters of visual acuity profile data based on known values. For example, the database may be used to look up a tolerance to defocus for a subject based on a maximum visual acuity for the subject, or vice versa. For example, the database may be used to look up blur for a subject based on a maximum visual acuity for the subject, or vice versa.

The visual acuity profile of a subject is comprised of visual acuity data. The visual acuity data for a subject is evaluated according to one or more rules to determine lens generation parameters to create a more pleasing and better performing lens for a subject (see FIG. 2, block 230). Merit functions that incorporate visual acuity data may be used as rules. In one embodiment, the useful area of a lens is included in a merit function that optimizes for lens power distribution along with the corridor length or the location and magnitude of the maxima of unwanted astigmatism. This yields a unique customized ophthalmic lens that takes into account the visual acuity profile to optimize for usability and comfort.

This embodiment comprises a selection algorithm to compute the optimal minimum fitting height of a design for a subject by taking into account all the properties of the design itself other than the corridor length and minimum fitting height, and partial or complete information on the visual acuity profile of the user.

A lens parameter that directly depends on the visual acuity profile is the area of good vision, defined as the area of the region inside which the visual acuity is bigger than the maximum visual acuity minus a fixed threshold. This area can be computed on the whole lens, by using a variable object space, or can be computed at the far, intermediate and near objects, obtaining $A_{far}$, $A_{intermediate}$ and $A_{near}$. Another parameter depending on the visual acuity profile is the gradient of the visual acuity distribution. This gradient determines how fast visual acuity is changing from one point to a neighboring point. Local gradient or the global average of this gradient, $\mu_G$, can be used. Similarly, the standard deviation of the gradient distribution, $\sigma_G$, gives information about how localized the regions in which visual acuity is changing. These parameters and others can be evaluated as a function of the parameters defining the visual acuity profile, namely the maximum visual acuity or tolerance to defocus.

Because the same amount of blur causes different variations of visual acuity to different persons, each person will perceive different areas for a given blur distribution. The average gradient of visual acuity and the standard deviation of this gradient are computed as $$\mu_G = \frac{1}{N}\sum_{i=1}^{N} \sqrt{\left(\frac{\partial V}{\partial x}\right)_i^2 + \left(\frac{\partial V}{\partial y}\right)_i^2},$$

$$\sigma_G = \frac{1}{N}\sum_{i=1}^{N} \left[\mu_g - \sqrt{\left(\frac{\partial V}{\partial x}\right)_i^2 + \left(\frac{\partial V}{\partial y}\right)_i^2}\right]^2.$$

A merit function $M_1$ that depends on the parameters defining the visual acuity profile of the subject and the minimum fitting height (or corridor length) of the design may be used. In the merit function, $w_{\mu F}$, $w_{\mu I}$, $w_{\mu N}$, $w_{\sigma I}$, $w_{\sigma N}$, $w_{AF}$, $w_{AI}$ and $w_{AN}$ are weights whose values are obtained from experience or directly deduced from available data sets in a database. $\rho_G$, $\rho_{AF}$, $\rho_{AI}$ and $\rho_{AN}$ are regularizers for gradient, far region area, intermediate region area and near vision area respectively. The sub-indexes F, I and N differentiate the figures of average gradient, standard deviation of the gradient and area of good vision, at far, intermediate and near vision, respectively. Once the visual acuity profile is measured or inferred, the optimization (minimization) of the merit function is reduced as $$M_1 = \rho_G[(w_{\mu F}\mu_{GF} + w_{\mu I}\mu_{GI} + w_{\mu N}\mu_{GN}) + (w_{\sigma F}\sigma_{GF} + w_{\sigma I}\sigma_{GI} + w_{\sigma N}\sigma_{GN})] + \frac{\rho_{AF}}{A_F} + \frac{\rho_{AI}}{A_I} + \frac{\rho_{AN}}{A_N}.$$

Another merit function $M_2$ may be used in which $$M_2 = \rho_G[w_\mu(\mu_{GF} + \mu_{GI} + \mu_{GN})^2 + w_\sigma(\sigma_{GF} + \sigma_{GI} + \sigma_{GN})^2] + \frac{\rho_{AF}}{A_F} + \frac{\rho_{AI}}{A_I} + \frac{\rho_{AN}}{A_N}.$$

In this second merit function, the average gradient and the standard deviation of the gradient are managed globally for the whole lens. The selection of a merit function is made depending on the characteristics of successful historical application according to a number of subjects which may be determined by referral to the database. Other functions can be used as much as they grow with growing gradient and/or standard deviation of the gradient, and decrease with growing good vision areas, if the merit function is to be minimized, or the opposite if it is to be maximized.

In addition, personal biographical and medical information for the subject may also be used in determining a better performing lens. This includes age, race, medial conditions such as diabetes and high blood pressure, and others. The effect each these personal biographical and medical factors has on components of the visual acuity profile may be maintained in one or more databases that are part of the system described herein or made accessible to the system described herein.

As used herein $V_{max}$ is the maximum visual acuity, $\delta$ is blur, D is the pupil diameter, A is accommodation, $A_{max}$ is the maximum accommodation, and Q is the tolerance to defocus. The pupil diameter D may be measured and depends on age of the subject, available light during measurement, and health of the subject. Small pupil diameter D increases the effect of diffraction and reduces the effect of defocus and astigmatism on visual acuity. Larger pupil size D results in smaller diffraction which progresses to higher order aberrations. The maximum accommodation $A_{max}$ may be measured or obtained by an ophthalmological professional during a traditional eye examination. In some embodiments, the computation of blur takes into account the accommodation of the individual, A, according to the expression:

$$\delta = \sqrt{\frac{1}{2}[(S-A)^2 + (S-A+C)^2]}$$

where the accommodation is given by $$A = \begin{cases} 0 & \text{if } -(S+C/2) \leq 0 \\ S+C/2 & \text{if } 0 < -(S+C/2) < A_{max}, \\ A_{max} & \text{if } A_{max} \leq -(S+C/2) \end{cases}$$

The tolerance to defocus Q, although preferably measured, is not typically evaluated by an ophthalmological professional, so is, for the purposes of most implementations of the methods described herein, estimated based on statistical information.

Figure 3:
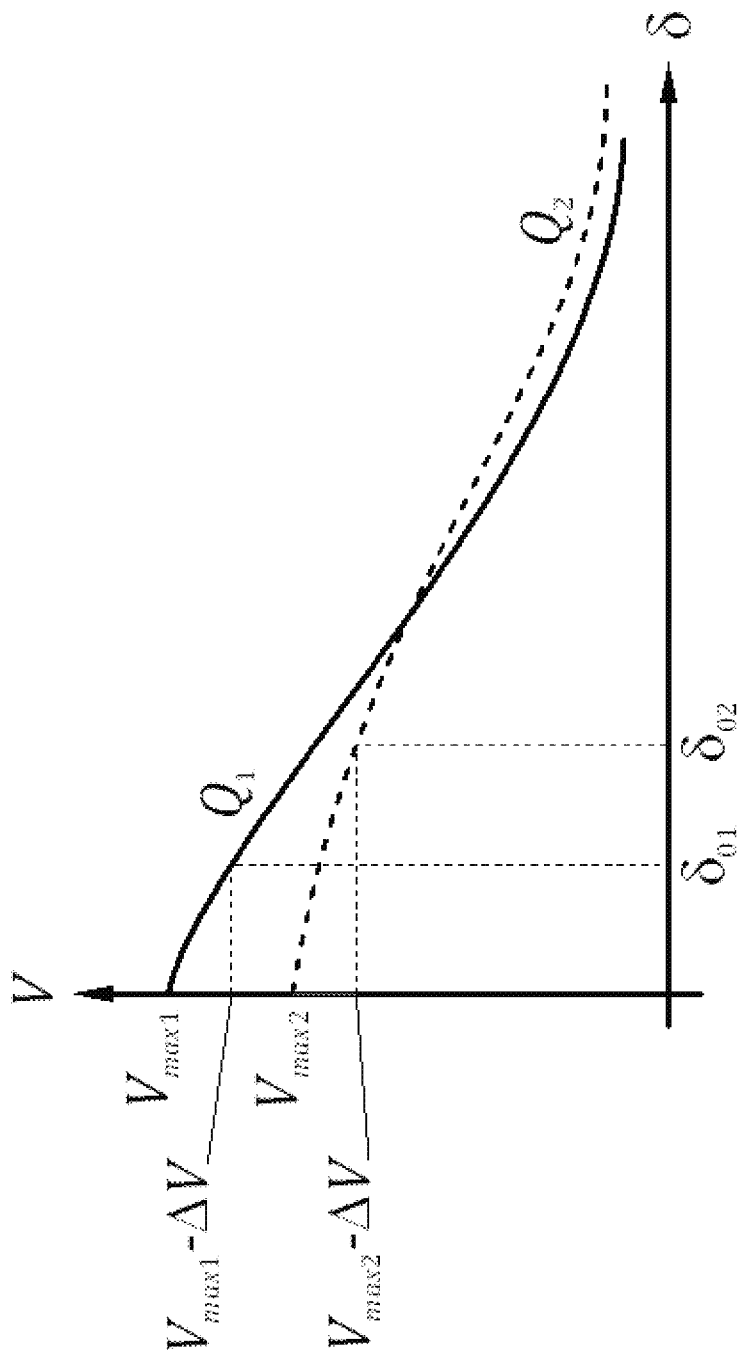
FIG. 3 is a two-dimensional graph showing the relationship among maximum visual acuity $V_{max}$, blur $\delta$ and the tolerance to defocus Q.
Figure 4:
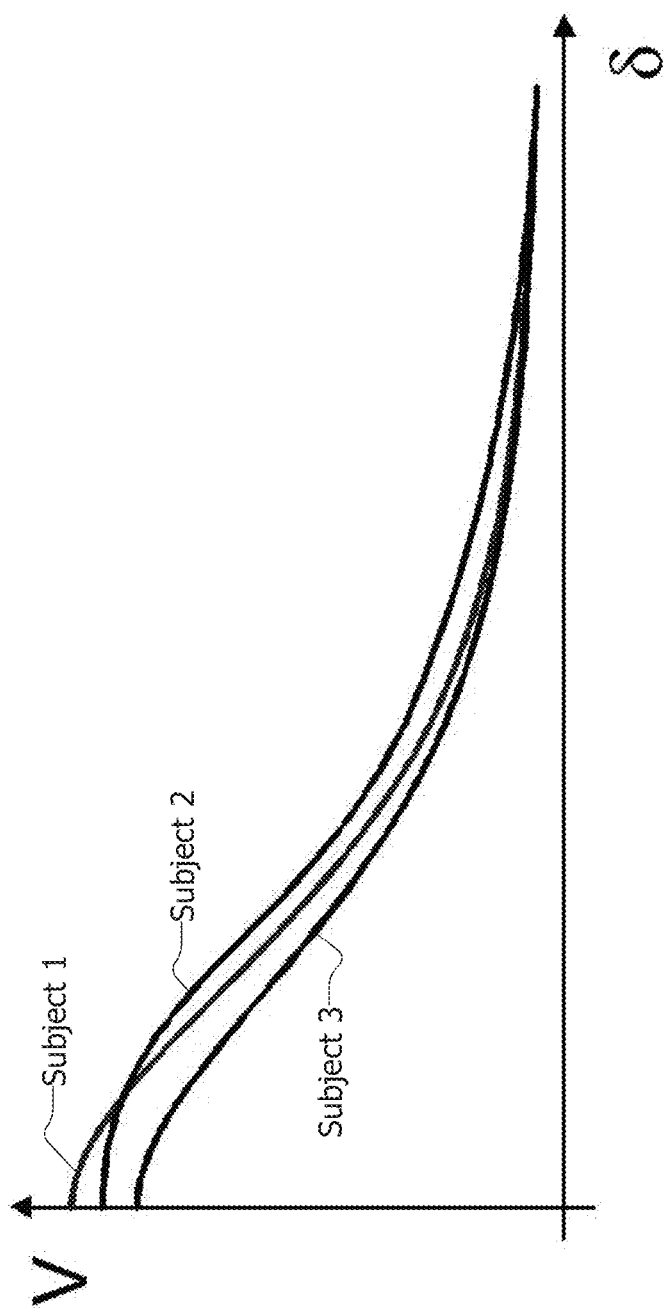
FIG. 4 is a two-dimensional graph showing the differing visual acuity of three example subjects having the same ophthalmic prescription.

The need for the benefits of the method described above regarding FIG. 2 is shown by the graphs in FIGS. 3, 4 and 5 which depict how different subjects have different visual acuity profiles even if they have the same prescription. The visual acuity profile determines how different users perceive regions in a lens. Based on the visual acuity profile for an individual, a better performing lens for that individual can be designed and made.

Referring now to FIG. 3, a two-dimensional graph showing the maximum visual acuity $V_{max}$ and blur $\delta$ used to derive the tolerance to defocus Q. The relationship between blur and visual acuity is not uniform among people, but depends on personal characteristics. The greater the tolerance to defocus, the flatter the curve. The tolerance to defocus Q may be derived in multiple ways using different formulas and functions. One example is that the tolerance to defocus Q is derived from the formula $\Delta V/\Delta\delta$ along a portion of the blur curve shown in FIG. 3. Curves $Q_1$ and $Q_2$ in FIG. 3 represent two visual acuity profiles graphically. There is a maximum visual acuity for each individual represented by the curves, namely $V_{max1}$ and $V_{max2}$. For each visual acuity profile, there is a maximum amount of defocus the individuals can withstand before their visual acuities drop below their maximum value minus a certain tolerance level of visual acuity loss represented as $\Delta V$ and referred to herein as tolerable blur. As shown, $\delta_{01}$ is the maximum defocus a first individual can withstand before that person's visual acuity drops $\Delta V$ units of visual acuity, that is, below or to the tolerable blur. That is, the tolerable blur $\delta_{tol}$ for individual one is $\delta_{01}$. This may be thought of as that individual's defocus threshold beyond which visual perception is degraded to an unsatisfactory point. $\delta_{01}$ is associated with a defocus tolerance parameter $Q_1$, $\delta_{02}$ is the maximum defocus (or focus threshold) the second individual can withstand before the second person's visual acuity drops $\Delta V$ units of visual acuity, that is, below or to the tolerable blur. That is, the tolerable blur $\delta_{tol}$ for individual two is $\delta_{02}$. $\delta_{02}$ is associated with a defocus tolerance parameter $Q_2$. $Q$ is computed by the formula $\Delta V/\delta_0$ for an individual. In this way, Q is associated with the slope at which maximum visual acuity decreases with defocus when defocus is small. The value of the following equation may be used to measure of defocus tolerance: $(V_{max}-\Delta V)/\Delta\delta$ or $(V_{max}-\Delta V)/\delta_{FT}$.

The amount of tolerable defocus can be measured by an ophthalmic professional. The following method can be used. Provide the patient with the best possible correction, and measure Maximum Visual Acuity, $V_{max}$ using one of the methods described above. The ophthalmic professional then adds a trial lens with spherical power S, inducing a blur $\delta_1$=S. This lens should have a power between 0.5 and 1.5 D, the recommended value being 1 D. With this induced blur, the ophthalmic professional measures the visual acuity, referred to as $V_1$. The tolerable blur $\delta_{tol}$ that will produce a loss of visual acuity $\Delta V$ is computed using this equation:

$$\delta_{tol} = \delta_1 \sqrt{\frac{\Delta V}{V_0 - V_1}}.$$

The difference in visual acuity among individuals can be seen in FIG. 4. Referring now to FIG. 4, a two-dimensional graph of the visual acuity V and blur $\delta$ of three example subjects having the same ophthalmic prescription is shown. Here subject 1, subject 2 and subject 3 each have the same ophthalmic prescription but their perception, the quality of their vision, differs because their eyes have different characteristics and their neural processing capabilities differ. As shown by the graph, the same prescription yields differing improvements for each subject. As such, a traditional one size fits all prescription does not yield the best or a preferred ophthalmologic improvement for the subjects. By taking a subject's visual acuity profile into consideration during the lens parameter creation process, an improved lens for the subject results.

Figure 5B:
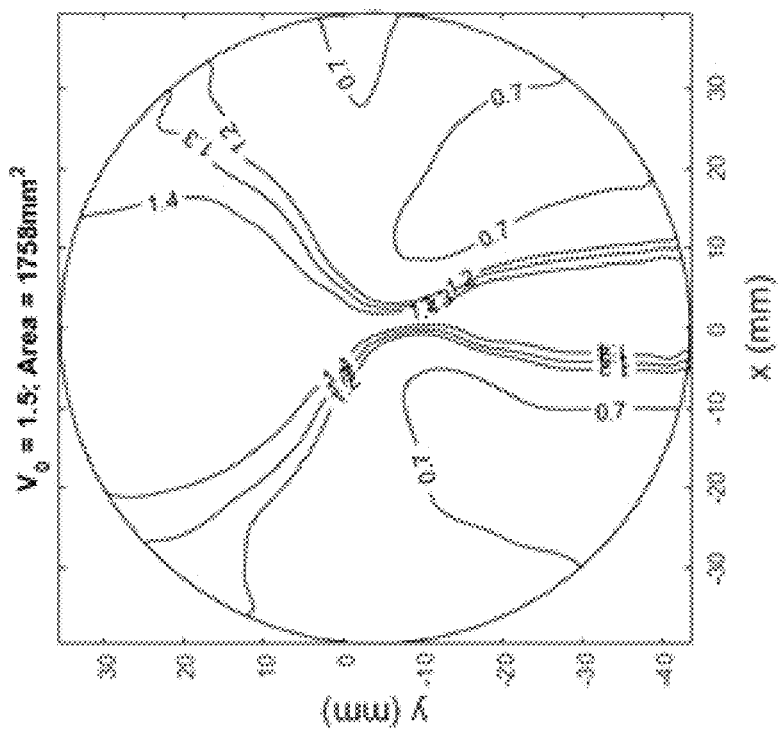
FIGS. 5A and 5B are example visual acuity field graphs perceived by two individuals with the same prescription using the same lens.
Figure 5A:
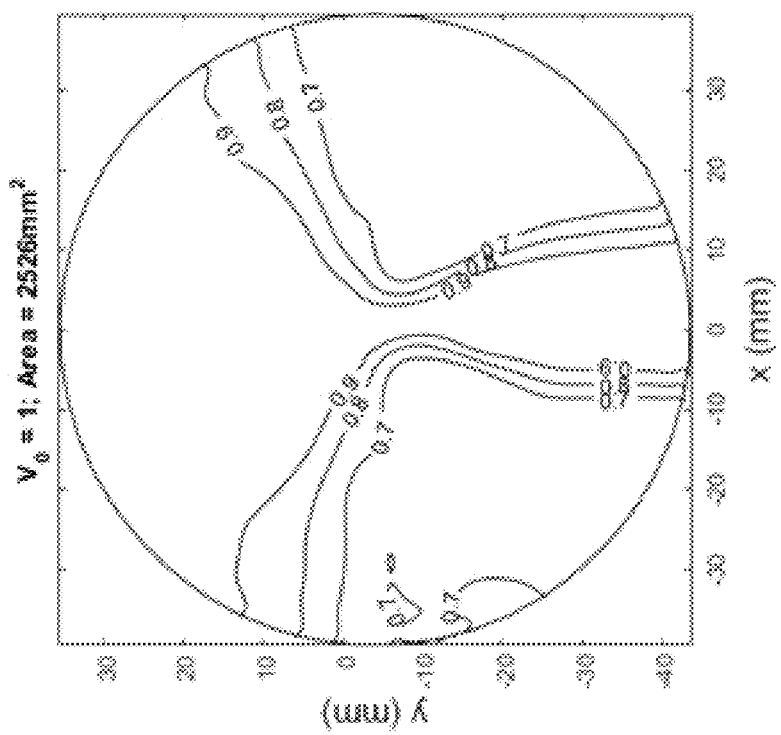

Referring now to FIGS. 5A and 5B, there are shown example visual acuity field graphs. These graphs represent the visual acuity of two subjects with the same prescription using the same lens, but with different visual acuity profiles: $V_0$=1, D=3 mm, $A_{max}$=1, Q=2 and k=0.5 for FIG. 5A and the same parameters except for $V_0$=1.5 in FIG. 5B. In both graphs, three iso-acuity lines correspond to the maximum visual acuity minus 0.1, 0.2 and 0.3 in decimal scale. In FIG. 5B the iso-line 0.7 is also included for comparison. Any reduction in visual acuity is perceived in a similar way by the two individuals represented in the graphs, the subject with higher acuity (shown in FIG. 3B) perceives smaller regions in which the acuity reduction is smaller than 0.3. From an absolute point of view, the subject with higher acuity sees better throughout the lens, as demonstrated by the position of iso-acuity line 0.7. But the subjective reduction of visual acuity due to the reduction of the visual field is stronger for the individual with higher visual acuity. This effect correlates with the experiential fact that different users, even with similar refractive errors, report different visual fields when using the same lens. When evaluating the computed area within which visual acuity is higher than $V_0$–0.2, for the subject in FIG. 5A this area is 2526 mm$^2$, whereas the value is 1758 mm$^2$ for the subject in FIG. 5B (total lens area is 4902 mm$^2$).

Closing Comments

Throughout this description, the embodiments and examples shown should be considered as exemplars, rather than limitations on the computing device and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A computing device comprising a processor, a memory and a storage medium, the storage medium storing a program having instructions which when executed by a processor cause the processor to perform operations comprising:
   receiving ophthalmic prescription information for a subject;
   obtaining visual acuity profile data for the subject, the visual acuity profile data including a maximum visual acuity for the subject;
   creating a visual acuity profile for the subject including the maximum visual acuity and tolerable blur;
   generating ophthalmic lens parameters for the subject by applying one or more rules selected from a group of rules to the ophthalmic prescription information and the visual acuity profile, wherein the group of rules includes the following:
   generate the lens with corridor length that minimizes the function $$M_1 = \rho_G[(w_{\mu F}\mu_{GF} + w_{\mu I}\mu_{GI} + w_{\mu N}\mu_{GN}) + (w_{\sigma F}\sigma_{GF} + w_{\sigma I}\sigma_{GI} + w_{\sigma N}\sigma_{GN})] + \frac{\rho_{AF}}{A_F} + \frac{\rho_{AI}}{A_I} + \frac{\rho_{AN}}{A_N}$$

where $\mu_{GF}$, $\mu_{GI}$, $\mu_{GN}$ are averaged gradients of visual acuity distribution at far, intermediate and near regions; $\sigma_{GF}$, $\sigma_{GI}$, $\sigma_{GN}$, are a standard deviation of visual acuity distribution in these regions; $A_F$, $A_I$, $A_N$ are the areas of good vision in the far, intermediate and near region; and parameters $w_x$, and $\rho_x$ are weighting factors.

2. The computing device of claim 1 wherein the tolerable blur is extrapolated from the maximum visual acuity.

3. The computing device of claim 1 wherein the tolerable blur is measured by an ophthalmic professional.

4. The computing device of claim 1 wherein the visual acuity profile data further includes a at least one selected from the group including a pupil diameter in normal conditions, a pupil diameter at specialized conditions, and a maximum accommodation.

5. The computing device of claim 1 wherein the visual acuity profile data further includes at least one from the group including: third and higher order aberrations of the eye, retinal photoreceptor cell packing information, neural processing information for the subject.

6. The computing device of claim 4 wherein a user accommodation, A, is applied to reduce blur according to the following:

$$\delta = \sqrt{\frac{1}{2}[(S-A)^2 + (S-A+C)^2]},$$

where $$A = \begin{cases} 0 & \text{if } -(S+C/2) \leq 0 \\ S+C/2 & \text{if } 0 < -(S+C/2) < A_{max} \\ A_{max} & \text{if } A_{max} \leq -(S+C/2) \end{cases}$$

and $A_{max}$ is the maximum accommodation of the subject wherein S is spherical defocus and C is cylindrical astigmatism.

7. The computing device of claim 3 wherein the tolerable blur is obtained from the difference between the measured maximum visual acuity and a visual acuity at a blur threshold, where the blur is caused by both spherical and astigmatic defocus.

8. The computing device of claim 2 wherein the pupil diameter is a measurement of the diameter of the pupil of the subject.

9. The computing device of claim 1 wherein the group of rules further includes the following function: generate a lens that, according to the maximum visual acuity and tolerance to defocus of the individual, provides minimally acceptable areas of good vision, at at least one of a far region, an intermediate region, and a near region.

10. The computing device of claim 1 wherein the group of rules further includes the following: generate the lens with the longest possible corridor that, according to the maximum visual acuity, tolerance to defocus and pupil diameter, provides a minimum value of visual acuity at near vision and at some position along a main vertical meridian of the lens.

11. The computing device of claim 1 wherein the storage medium has further instructions stored thereon which when executed by the processor cause the computing device to initiate manufacture of ophthalmic lenses for the subject according to the ophthalmic lens parameters.

12. The computing device of claim 1 wherein the storage medium has further instructions stored thereon which when executed by the processor cause the computing device to perform further actions including: receiving personal biographic and/or medical information for the subject as part of the visual acuity profile data, wherein the generating is further based on the biographic and/or medical information for the subject.

13. The computing device of claim 12 wherein the biographic information includes at least one of age of the subject, race of the subject and sex of the subject.

14. The computing device of claim 12 wherein the medical information includes a designation of at least one of whether the subject has been diagnosed as diabetic and/or having high blood pressure.

15. A method comprising:
receiving ophthalmic prescription information for a subject;
obtaining visual acuity profile data for the subject, the visual acuity profile data including a maximum visual acuity for the subject;
creating a visual acuity profile for the subject including the maximum visual acuity and tolerable blur;
generating ophthalmic lens parameters for the subject by applying one or more rules selected from a group of rules to the ophthalmic prescription information and the visual acuity profile, wherein the group of rules includes the following:
generate the lens with corridor length that minimizes the function $$M_1 = \rho_G[(w_{\mu F}\mu_{GF} + w_{\mu I}\mu_{GI} + w_{\mu N}\mu_{GN}) + (w_{\sigma F}\sigma_{GF} + w_{\sigma I}\sigma_{GI} + w_{\sigma N}\sigma_{GN})] + \frac{\rho_{AF}}{A_F} + \frac{\rho_{AI}}{A_I} + \frac{\rho_{AN}}{A_N}$$

where $\mu_{GF}, \mu_{GI}, \mu_{GN}$ are averaged gradients of visual acuity distribution at far, intermediate and near regions; $\sigma_{GF}, \sigma_{GI}, \sigma_{GN}$, are a standard deviation of visual acuity distribution in these regions; $A_F, A_I, A_N$ are the areas of good vision in the far, intermediate and near region; and parameters $w_x$, and $\rho_x$ are weighting factors.

16. The method of claim 15 wherein the tolerable blur is extrapolated from the maximum visual acuity.

17. The method of claim 15 wherein the tolerable blur is measured by an ophthalmic professional.

18. The method of claim 15 wherein the visual acuity profile data further includes a at least one selected from the group including a pupil diameter in normal conditions, a pupil diameter at specialized conditions, and a maximum accommodation.

19. The method of claim 15 wherein the visual acuity profile data further includes at least one from the group including: third and higher order aberrations of the eye, retinal photoreceptor cell packing information, neural processing information for the subject.

20. The method of claim 18 wherein a user accommodation, A, is applied to reduce blur according to the following:

$$\delta = \sqrt{\frac{1}{2}[(S-A)^2 + (S-A+C)^2]},$$

where $$A = \begin{cases} 0 & \text{if } -(S+C/2) \leq 0 \\ S+C/2 & \text{if } 0 < -(S+C/2) < A_{max} \\ A_{max} & \text{if } A_{max} \leq -(S+C/2) \end{cases}$$

and $A_{max}$ is the maximum accommodation of the subject, wherein S is spherical defocus and C is cylindrical astigmatism.

21. The method of claim 17 wherein the tolerable blur is obtained from the difference between the measured maximum visual acuity and a visual acuity at a blur threshold, where the blur is caused by both spherical and astigmatic defocus.

22. The method of claim 16 wherein the pupil diameter is a measurement of the diameter of the pupil of the subject.

23. The method of claim 15 wherein the group of rules further includes the following function: generate a lens that, according to the maximum visual acuity and tolerance to defocus of the individual, provides minimally acceptable areas of good vision, at at least one of a far region, an intermediate region, and a near region.

24. The method of claim 15 wherein the group of rules further includes the following: generate the lens with the longest possible corridor that, according to the maximum visual acuity, tolerance to defocus and pupil diameter, provides a minimum value of visual acuity at near vision and at some position along a main vertical meridian of the lens.

25. The method of claim 15 further comprising: initiating manufacture of ophthalmic lenses for the subject according to the ophthalmic lens parameters.

26. The method of claim 15 further comprising: receiving personal biographic and/or medical information for the subject as part of the visual acuity profile data, wherein the generating is further based on the biographic and/or medical information for the subject.

27. The method of claim 26 wherein the biographic information includes at least one of age of the subject, race of the subject and sex of the subject.

28. The method of claim 26 wherein the medical information includes a designation of at least one of whether the subject has been diagnosed as diabetic and/or having high blood pressure.

* * * * *